United States Patent
Mogi et al.

(10) Patent No.: US 8,619,537 B2
(45) Date of Patent: Dec. 31, 2013

(54) OPTICAL PICKUP DEVICE AND METHOD OF MANUFACTURING THE SAME

(75) Inventors: Takayuki Mogi, Ota (JP); Takao Fukumoto, Ota (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 13/535,010

(22) Filed: Jun. 27, 2012

(65) Prior Publication Data

US 2013/0003518 A1    Jan. 3, 2013

(30) Foreign Application Priority Data

Jun. 29, 2011   (JP) ................................ 2011-143972

(51) Int. Cl.
*G11B 17/00*    (2006.01)

(52) U.S. Cl.
USPC ........................................ 369/244.1; 720/689

(58) Field of Classification Search
USPC ........................................ 369/244.1; 720/689
See application file for complete search history.

(56) References Cited

U.S. PATENT DOCUMENTS

| | | | | |
|---|---|---|---|---|
| 5,241,528 A * | 8/1993 | Mohri et al. | ................... | 720/685 |
| 7,195,498 B1 * | 3/2007 | Wang et al. | ..................... | 439/83 |
| 2001/0004347 A1 * | 6/2001 | Koga et al. | ..................... | 369/116 |
| 2005/0013233 A1 * | 1/2005 | Chou et al. | ..................... | 369/116 |
| 2005/0237868 A1 * | 10/2005 | Nabe et al. | .................. | 369/44.11 |
| 2006/0250901 A1 * | 11/2006 | Sudo et al. | ......................... | 369/1 |
| 2007/0171552 A1 * | 7/2007 | Holderer et al. | .............. | 359/819 |
| 2008/0080340 A1 * | 4/2008 | Nishiyama et al. | ......... | 369/44.37 |
| 2008/0153349 A1 * | 6/2008 | Shiu | ............................... | 439/563 |
| 2009/0175152 A1 * | 7/2009 | Torii | .............................. | 369/116 |
| 2010/0051241 A1 * | 3/2010 | Kopp et al. | .............. | 165/104.31 |
| 2010/0079934 A1 * | 4/2010 | Nakamura et al. | ........ | 361/679.01 |
| 2010/0118686 A1 * | 5/2010 | Bammert et al. | ......... | 369/112.23 |
| 2010/0122837 A1 * | 5/2010 | Motsch et al. | ................ | 174/250 |
| 2011/0199886 A1 * | 8/2011 | Takanashi et al. | ............ | 369/122 |

FOREIGN PATENT DOCUMENTS

JP       2005-216436        8/2005

* cited by examiner

*Primary Examiner* — Brenda Bernardi
(74) *Attorney, Agent, or Firm* — Morrison & Foerster LLP (57) ABSTRACT

Provided is an optical pickup device capable of preventing a soldering work from physically damaging any part of a housing of the optical pickup device. In the optical pickup device to be provided, a circuit board fixed to an LD holder and a circuit board covering a housing from below are connected via a solder joint. An inner-side part of an upper-end portion of an external sidewall of the housing located near the connecting position is cut away to form a cut surface. When a soldering iron is used to form the solder joint to connect the two circuit boards, the cut surface prevents the soldering iron from touching the external sidewall and thereby preventing this part of the external sidewall from being damaged by the soldering iron.

12 Claims, 5 Drawing Sheets

PRIOR ART

# US 8,619,537 B2

OPTICAL PICKUP DEVICE AND METHOD OF MANUFACTURING THE SAME

This application claims priority from Japanese Patent Application Number JP 2011-143972 filed on Jun. 29, 2011, the content of which is incorporated herein by reference in its entirety.

BACKGROUND OF THE INVENTION

1. Field of the Invention

The invention relates to an optical pickup device and a method of manufacturing the optical pickup device. In particular, the invention relates to an optical pickup device in which electronic components are connected by an electrically-conductive binder such as solder, and also relates to a method of manufacturing the optical pickup device.

2. Description of the Related Art

An optical pickup device has functions to make a light-emitting element emit a laser beam of a predetermined wavelength onto an optical disc, and then to make a light-receiving element detect the laser beam reflected by an information recording layer of the optical disc (see Japanese Patent Application Laid-Open No. 2005-216436). Thus, the optical pickup device is capable of reading and writing information from and to an optical disc. A known optical pickup device includes a housing which is integrally molded from a resin material, which mounts therein electronic components such as a light-emitting element and a light-receiving element and optical elements such as various kinds of lenses and a semi-transparent mirror, and to which an objective-lens driver unit is configured to drive an objective lens is fixed.

Figure 5:
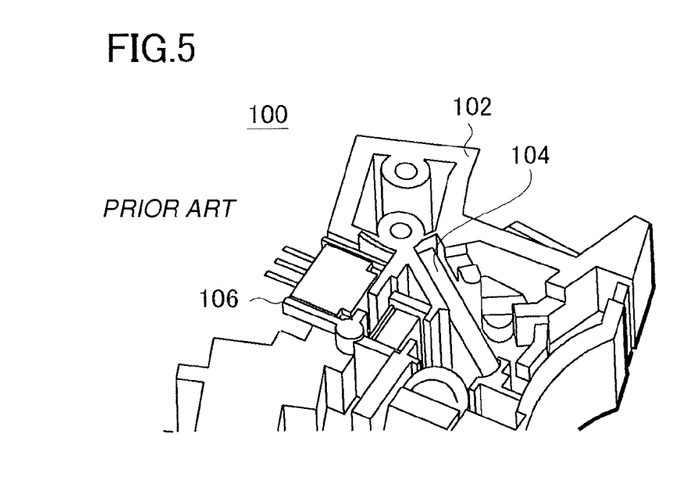
FIG. 5 is a perspective view illustrating an optical pickup device of the related art.

FIG. 5 is a perspective view illustrating a part of a conventional optical pickup device 100. As shown in FIG. 5, electronic components and optical elements such as a laser diode 106 and a semitransparent mirror 104 are fixed to predetermined positions in a housing 102 of the optical pickup device 100.

An optical pickup device with the above-described configuration is manufactured in the following way. Firstly, electronic components and optical elements such as a light-emitting element, a light-receiving element, various lenses, and mirrors are placed at predetermined positions in the housing 102. Secondly, the electronic components are electrically connected to predetermined portions via a circuit board fixed to the housing 102. Then, with a laser beam actually emitted from the light-emitting element, some predetermined optical elements and the light-receiving element are adjusted to such positions that the laser beam emitted by the light-emitting element can be cast upon a predetermined light-receiving area of the light-receiving element.

SUMMARY OF THE INVENTION

The electronic components such as the laser diode 106 described above are connected to a main circuit board of the optical pickup device, and the main circuit board is provided with a connector for connection to an optical disc drive. In a usual practice to connect an electrical component to the main circuit board, a flexible board connected to a connector terminal of the electronic component is connected to the main circuit board. In some cases, however, for reducing the manufacturing cost, an ordinary rigid circuit board is required to be connected to a connector terminal of the electronic component and also directly to the main circuit board.

To obtain sufficient mechanical strength of the housing 102 and/or to protect the connector terminal of the electronic component, the electronic component sometimes needs to be disposed in a housing area in a space surrounded by sidewalls of the housing 102.

In the case where the main circuit board is connected by soldering to the rigid circuit board connected to the electronic component disposed in the housing area of the housing 102, the hot soldering iron may accidentally come into contact with the sidewalls of the housing 102 at the connection step. This is because the main circuit board is attached to the housing 102 and the position to be soldered is surrounded by the intricately-shaped sidewalls of the housing 102. In this case, the contact with the hot soldering iron may melt the sidewalls of the housing 102, resulting in deterioration in the external appearance and/or mechanical strength of the housing 102.

The invention made in view of the problem described above provides an optical pickup device in which damage of any part of a housing in soldering work can be prevented, and a method of manufacturing the same.

An optical pickup device of the present invention is characterized by including: electronic components including a light-emitting element configured to emit a laser beam and a light-receiving element configured to receive a laser beam reflected by an optical recording medium; an optical element forming an optical path to guide the laser beam emitted by the light-emitting element to the optical recording medium and to guide the laser beam reflected by the optical recording medium to the light-receiving element; and a housing where the electronic components and the optical element are mounted, the housing including a principal surface portion, an external sidewall protruding continuously from an outer edge of the principal surface portion in a thickness direction of the principal surface portion, an internal sidewall formed in an area surrounded by the external sidewall, and protruding continuously from the principal surface portion protrude in the thickness direction, a housing area surrounded by any of the internal sidewall and the external sidewall, and an opening portion formed by opening a part of the principal surface portion. The optical pickup device of the present invention further includes: an objective lens driver unit including an actuator to drive an objective lens, and being fixed to the principal surface portion of the housing; a first circuit board disposed on the principal surface portion of the housing; and a second circuit board attached to one of the electronic components and connected via an electrically-conductive binder to the first circuit board exposed to the housing area through the opening portion. An inner-side part of a protruding end portion of the external sidewall near the second circuit board is formed as a cut surface.

A method of manufacturing an optical pickup device of the present invention includes the steps of: forming a housing including a principal surface portion, an external sidewall protruding continuously from an outer edge of the principal surface portion in a thickness direction of the principal surface portion, an inner-side part of a protruding end portion of the external sidewall near the second circuit board being formed as a cut surface, an internal sidewall formed in an area surrounded by the external sidewall, and protruding continuously from the principal surface portion in the thickness direction, a housing area surrounded by any of the internal sidewall and the external sidewall, an opening portion formed by opening a part of the principal surface portion; a first principal surface in which the principal surface portion is exposed, and a second principal surface that is opposite the first principal surface; disposing a first circuit board on the first principal surface of the housing; mounting, in the housing area of the housing, an electronic component to which a second circuit board is attached; and connecting the first circuit board and the second circuit board via an electrically-conductive binder melted by a melting tool inserted, through a space created by forming the cut surface, into the housing area where the second circuit board is mounted.

BRIEF DESCRIPTION OF THE DRAWINGS

FIGS. 1A and 1A show diagrams each illustrating an optical pickup device of the invention.

FIG. 2 is a diagram illustrating the optical pickup device of the invention, and to be more specific, is a perspective view illustrating a housing alone without any of optical elements and the like.

FIGS. 3A and 3B show diagrams each illustrating the optical pickup device of the invention.

DESCRIPTION OF THE PREFERRED EMBODIMENTS

The configuration of an optical pickup device according to a first embodiment of the invention will be described below by referring to FIGS. 1A to 3B.

In an optical pickup device 10 to be described hereinbelow, electronic components such as a laser diode serving as a light-emitting element and a PDIC serving as a light-receiving element, and optical elements such as a semitransparent mirror, a diffraction grating, a collimator lens, and a reflecting mirror are mounted in a housing 12 and an objective lens driver unit 24 including an actuator configured to drive an objective lens 26 is fixed to the housing 12.

Figure 1A:
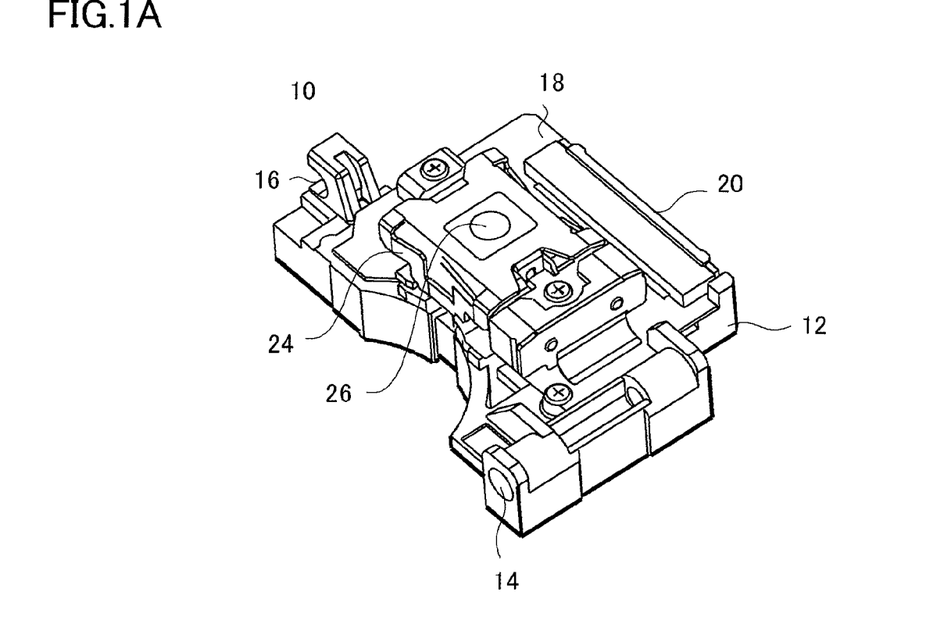
FIG. 1A is a perspective view of the optical pickup device placed in a manner that a side where an objective lens is exposed faces upwards.
Figure 1B:
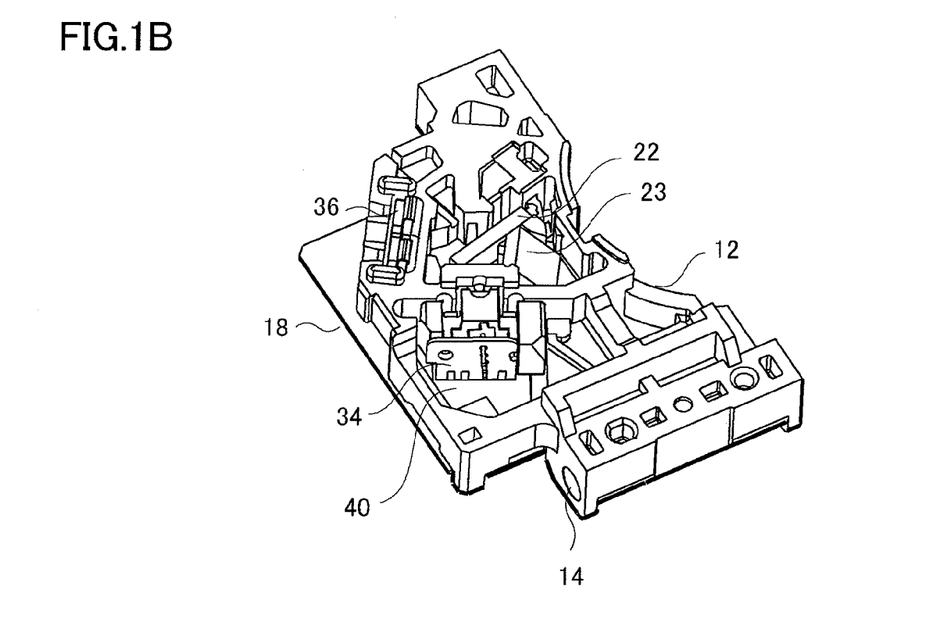
FIG. 1B is a perspective view of the optical pickup device in FIG. 1A is upside down.

Firstly, the optical pickup device 10 will be described below by referring to FIGS. 1A and 1B. FIG. 1A is a perspective view of the optical pickup device 10 viewed from above. FIG. 1B is a perspective view where the optical pickup device 10 in FIG. 1A is upside down.

The optical pickup device 10 has a function of focusing a laser beam of the BD (Blu-ray Disc), DVD (Digital Versatile Disk), or CD (Compact Disk) standard on a point in an information recording layer of an optical disc (information recording medium), and a function of receiving the beam reflected by the information recording layer, and converting the received beam to an electric signal. The optical pickup device 10 does not necessarily have to support the laser beams of all of the above three standards, but may support a laser beam of only one or two of the three standards.

To be more specific, the optical pickup device 10 includes the housing 12 made of a resin material, and also includes various kinds of optical elements each of which is mounted either inside of the housing 12 or on a surface of the housing 12. These optical elements form an optical path to guide the laser beam emitted by the laser diode to the optical disc and guide the laser beam reflected by the optical disc to the PDIC.

A housing 12 is integrally molded from a resin material by injection molding. Housing areas where optical elements and/or electronic components can be mounted are formed in the housing 12. Details of the housing 12 will be described later by referring to FIG. 2. A possible resin material to be used for the housing 12 includes a polycarbonate resin, an m-PPE resin, or an ABS resin.

A guide hole 14 is formed in an end portion of the housing 12, and a guide groove 16 is formed in an opposite end portion. When the optical pickup device 10 is actually used, a guide shaft is inserted into the guide hole 14 while another guide shaft is fitted in the guide groove 16. The optical pickup device 10 is thus allowed to move along these guide shafts.

Referring to FIG. 1A, the objective lens driver unit 24 is fixed to a principal surface portion of the housing 12, which is a top surface of the housing 12. A circuit board 18 (a first circuit board) is disposed around the objective lens driver unit 24. The circuit board 18 is a rigid circuit board made of an electrically-insulating material, such as a glass-epoxy material. The thickness of the circuit board is approximately 0.5 mm. A conductive pattern with a predetermined shape is formed on each of the two principal surfaces. The circuit board 18 is fixed to the principal surface portion of the housing 12 via a fastener such as a screw. In addition, a connector 20 serving as an input-output terminal of the circuit board 18 to the outside (optical disc drive) and a resin package that encapsulates an LSI including a controller circuit are disposed on the top surface of the circuit board 18. In this embodiment, the circuit board 18 is provided to electrically connect the electronic components mounted in the housing 12 to each other and to electrically connect each of the electronic components to the connector. The use of an inexpensive glass-epoxy material as the material for the circuit board 18 can reduce the manufacturing cost of the optical pickup device 10.

The objective lens 26, which is held by the lens holder, is kept in a state where the position of the objective lens 26 can be changed by the objective lens driver unit 24. The example in FIG. 1A shows only a single objective lens 26 shared by the laser beam of the CD standard and that of the DVD standard, but multiple objective lenses 26 may be provided in the actuator.

As shown in FIG. 1B, the optical elements and the electronic components are set in the multiple housing areas formed by dividing, with sidewalls, the space inside the housing 12 into segments. Specifically, a semitransparent mirror 22, a reflecting mirror 23, a PDIC circuit board 36, and a laser diode held by an LD holder 34 are disposed in the housing areas of the housing 12. These optical elements and electronic components are fixed to the housing 12 via an electrically insulating binder (adhesive) such as an epoxy resin.

In addition, some opening portions are formed in some parts of the principal surface portion of the housing 12. Specifically, within the housing 12, an opening portion is formed at a position where the PDIC circuit board 36 is disposed. A flexible circuit board that passes through this opening portion connects the PDIC to the circuit board 18. Another opening portion is formed at a position where the LD holder 34 is disposed. This opening portion provides the connection route between the laser diode (LD) built in the LD holder 34 and the circuit board 18. The structure to connect the LD holder 34 to the circuit board 18 will be described in detail later by referring to FIGS. 3A and 3B.

Now, a brief description is provided to explain how the optical pickup device 10 with the above-described configuration works. Firstly, the LD held by the LD holder 34 emits a laser beam of a predetermined standard. The emitted laser beam is reflected by both the semitransparent mirror 22 and the reflecting mirror 23, and then passes through the objective lens 26, which casts the laser beam onto the information recording surface of an optical disc. After the laser beam is reflected by the information recording surface of the optical disc, the laser beam passes through the objective lens 26 and is then reflected by the reflecting mirror 23. The laser beam thus reflected passes through the semitransparent mirror 22, and then is detected by the PDIC mounted on the PDIC circuit board 36. In this way, information stored in the optical disc is read out from the information recording surface of the optical disc, and information is written into the information recording surface of the optical disc.

More details of the shape of the housing 12 are described below by referring to FIG. 2. The housing 12 includes a plate-shaped principal surface portion 28 and external sidewalls 30. When viewed from above, the principal surface portion 28 has identical shape to the external form of the optical pickup device 10. The external sidewalls 30 are formed to protrude continuously from the peripheral portions of the principal surface portion 28 in the thickness direction of the principal surface portion 28. In addition, internal sidewalls 32 are provided in the area surrounded by the external sidewalls. The internal sidewalls 32 are formed to protrude continuously from the principal surface portion 28 in the thickness direction. All of these sidewalls 30 and 32 as well as the principal surface portion 28 have thicknesses that are substantially equal to one another. For example, a possible thickness is not smaller than 1.0 mm but not larger than 2.0 mm. In this embodiment, each housing area 40 is surrounded by the internal sidewalls 32 or by both the internal sidewalls 32 and the external sidewalls 30. To be more specific, a housing area 40 that is located near the center of the housing 12 may probably be surrounded solely by the internal sidewalls 32, but a housing area 40 that is located near the outer edge of the housing 12 may probably be surrounded by both the internal sidewalls 32 and the external sidewalls 30.

Figure 3A:
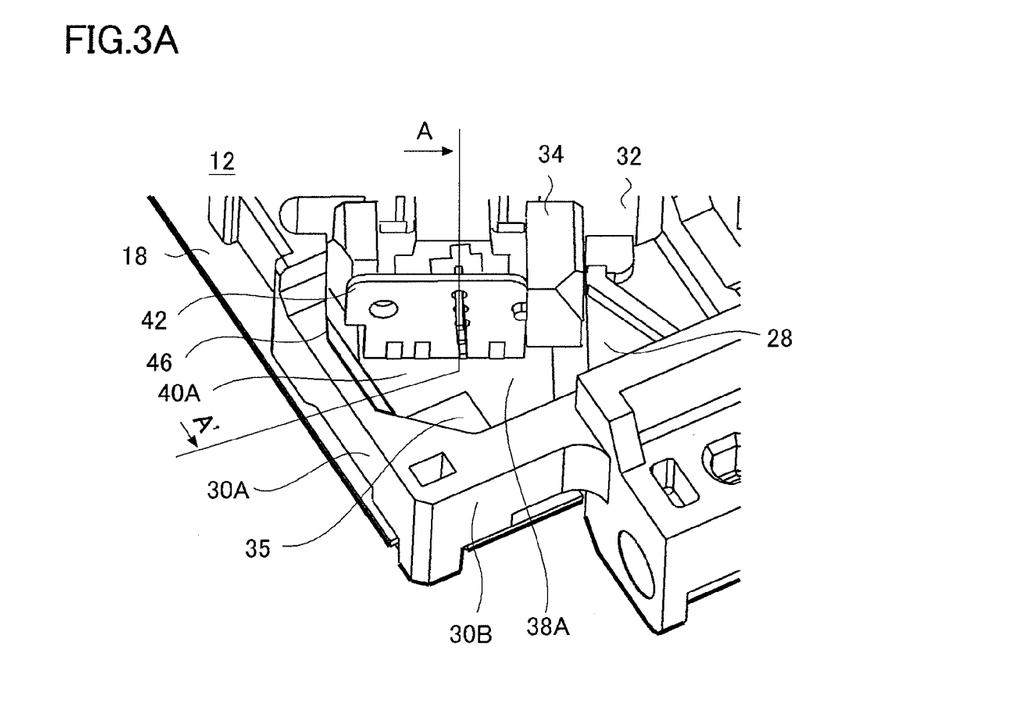
FIG. 3A is a perspective view illustrating by enlarging a part of the housing where an LD holder is mounted.
Figure 3B:
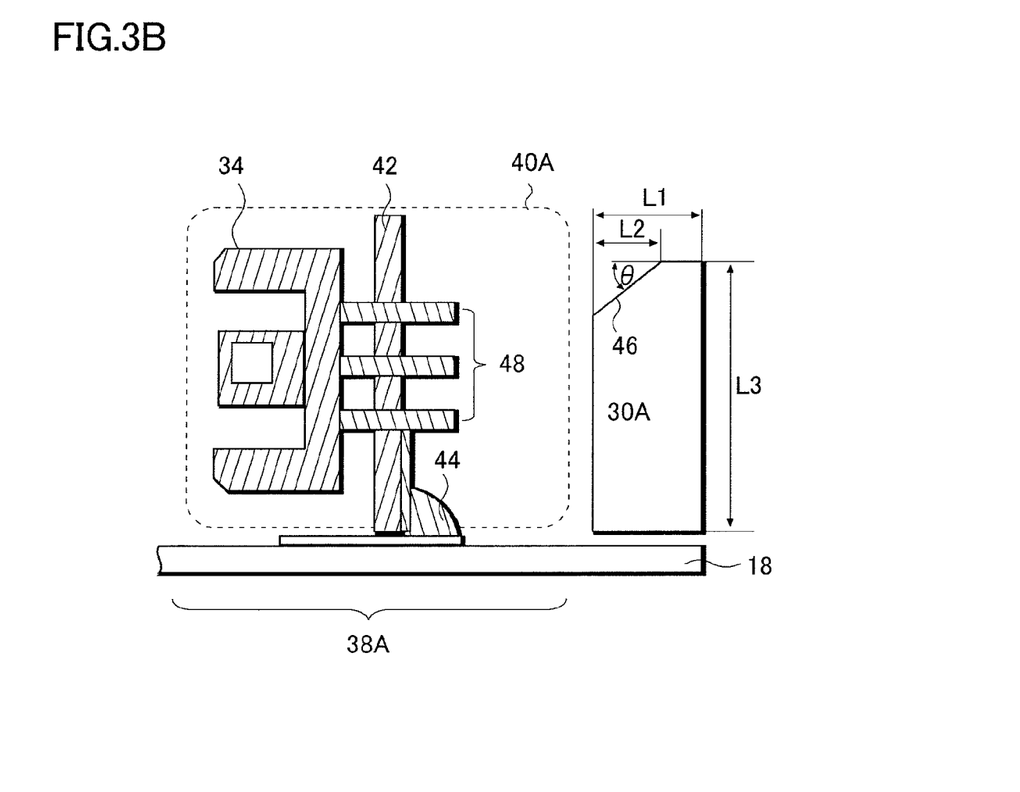
FIG. 3B is a sectional view taken along the line A-A' of FIG. 3A.

The structure to assemble the LD holder 34 to the housing 12 is described in detail below by referring to FIGS. 3A and 3B. FIG. 3A is a perspective view illustrating one of the housing areas 40 (hereinafter that one is referred to as the "housing area 40A") where the LD holder 34 is disposed. FIG. 3B is a sectional view taken along the line A-A' of FIG. 3A.

Referring to FIG. 3A, the housing area 40A is located in a corner portion of the housing 12. Of all the sides surrounding the housing area 40A, the two sides located on the nearer side in the drawing correspond to external sidewalls 30A and 30B, and each of the sides located on the farther side in the drawing corresponds to one of the internal sidewalls 32. The use of the sidewalls 30A, 30B, and 32 to surround the housing area 40A where the LD holder 34 is disposed can prevent the housing area 40A from being deformed when the optical pickup device 10 is actually used or at a time of resin molding. Accordingly, each of the electronic components such as the LD held by the LD holder 34 can be kept at the proper position with higher accuracy. In addition, the surrounding of the LD holder 34 by the sidewalls of the housing 12 provides a protection for connector terminals 48 of the LD held by the LD holder 34.

In the housing area 40A, an opening portion 38A is formed by removing the corresponding part of the principal surface portion 28. The top surface of the circuit board 18 is exposed through the opening portion 38A. On the circuit board 18, an IC package 35 is mounted in the portion that is exposed through the opening portion 38A. The package 35 includes a laser diode driver (LDD) configured to drive the LD.

As shown in FIG. 3B, the LD holder 34 disposed in the housing area 40A is fixed to one of the internal sidewalls 32. The LD holder 34 includes an LD capable of emitting a laser beam of one of the three standards mentioned earlier or LDs capable of emitting, respectively, laser beams of some of the three standards. The terminals 48 connected to these LDs are drawn out of the LD holder 34. These terminals 48 penetrate a circuit board 42 (second circuit board) to mount the LD holder 34 on the circuit board 42.

The circuit board 42 is a relay circuit board attached to the LD holder 34, and provides the connection between the LD held by the LD holder 34 and the circuit board 18. Like the circuit board 18, the circuit board 42 is a rigid, glass-epoxy circuit board. There may be other possible structures to connect the LD held by the LD holder 34 to the circuit board 18. The use of a flexible circuit board is one of such possible structures, but the use of the glass-epoxy circuit board that is less expensive than the flexible circuit board contributes to the cost reduction in this embodiment. As shown in FIG. 3B, the relay circuit board 42 stands vertically on the top surface of the circuit board 18. A slit-shaped opening portion may be formed in the circuit board 18 so that a part of the circuit board 42 can be set in the opening portion.

A solder joint (electrically-conductive binder) 44 is formed to connect the circuit board 42 to the circuit board 18. Specifically, by the solder joint 44, the conductive pattern of the circuit board 42 connected to the terminals 48 is electrically connected to the conductive pattern formed on the top surface of the circuit board 18. In this embodiment, three solder joints 44 are provided to connect the circuit board 42 and the circuit board 18 at three points, that is, the same number as the number of the terminals 48 (see FIG. 3A).

In this embodiment, a cut surface 46 is formed at a part of an upper-end portion of the external sidewall 30A facing the circuit board 42 attached to the LD holder 34. When a melting tool such as a soldering iron is used to melt the solder joints 44 to fix the circuit board 42, the cut surface 46 prevents the soldering iron from touching and melting the external sidewall 30A. Here, the cut surface 46 is also referred to as a "C surface."

To be more specific, the cut surface 46 is formed by cutting away an inner-side part of the upper-end portion of the external sidewall 30A. The cut surface 46 in this embodiment is a planar surface sloping downwards to the inner side, but may have another shape. For example, the cut surface 46 may have a cross-section with a curved-line shape bulging downwards, or bulging upwards.

The top surface of the external sidewall 30A has a width L1 of 2.0 mm, for example. The cut surface 46 has a width L2 that is, for example, not smaller than 1.0 mm but not larger than 1.5 mm, approximately. To put it differently, the width L2 of the cut surface 46 is equal to or larger than half of the width L1 of the external sidewall 30A. The cut-away portion removed from the external sidewall 30A to form the cut surface 46 has a large cross-sectional area. With the large cut-away portion, the contact of the soldering iron with the external sidewall 30A can be avoided reliably. If, in contrast, the width L2 of the cut surface 46 is shorter than 1.0 mm, the clearance to the outer side of the external sidewall 30A created by the cut surface 46 may possibly be insufficient. As a consequence, the soldering iron may possibly touch the external sidewall 30A. If the width L2 of the cut surface 46 is longer than 1.5 mm, a cut-away portion with an excessively large cross-sectional area is removed from the external sidewall 30A by forming the cut surface 46. The excessively large cut-away portion may impair the mechanical strength of the external sidewall 30A, causing the external sidewall 30A to be deformed or physically damaged when the optical pickup device 10 is actually used.

Referring to FIG. 3A, the housing area 40A where the LD holder 34 is disposed is surrounded by both the external sidewall 30A and the external sidewall 30B, which are at right angles to each other when viewed from above. It is conceivable to form the cut surface 46 in both of the external sidewall 30A and the external sidewall 30B. In this embodiment, however, only the cut surface 46 is formed in the external sidewall 30A, and no cut surface is formed in the external sidewall 30B. This is because the circuit board 42 is placed with most of the principal surface of the circuit board 42 facing the external sidewall 30A. Such orientation of the circuit board 42 makes the soldering iron used in the soldering work more likely to touch the external sidewall 30A and less likely to touch the external sidewall 30B. In addition, although forming the cut surface lowers the overall mechanical strength of the housing 12, the lowering of the mechanical strength can be reduced as little as possible by forming the cut surface 46 only in the external sidewall 30A.

Incidentally, the external sidewall 30A and the external sidewall 30B surrounding the housing area 40A where the LD holder 34 is mounted have the same thickness, which is not smaller than 1.0 mm but not larger than 2.0 mm. In the corner portion where the external sidewall 30A and the external sidewall 30B meet each other, the thickness of each of the sidewalls 40A and 40B becomes slightly thicker to the inner side, but in other areas, each of the two sidewalls 40A and 40B has a substantially uniform width. In addition, each of the external sidewalls 30A and 30B has a uniform height L3 measured in the up-and-down direction in the FIG. 3B. A possible range of the height L3 is not smaller than 4.0 mm but not larger than 5.0 mm. So, even if a relatively large-sized opening portion 38A is formed in the housing area 40A, the mechanical strength provided by the thick external sidewalls 30A and 30B is sufficient enough to prevent the deformation from occurring when the optical pickup device 10 is actually used or in other situations. In addition, the top surface of the external sidewall 30A and the top surface of the external sidewall 30B are flush with each other. Accordingly, the contact of the soldering iron with the housing 12 can be prevented more surely.

In addition, the height of the external sidewall 30A where the cut surface 46 is formed is at least half of that of the adjacent external sidewall 30. Accordingly, the external sidewall 30A gives both sufficient mechanical strength and a favorable external appearance to the housing 12. Furthermore, the external sidewall 30A being that high provides a protection for the terminals 48 of the LD held by the LD holder 34.

Next, a method of manufacturing an optical pickup device 10 according to the embodiment will be described below by referring to FIGS. 1A to 4. As shown in FIGS. 1A and 1B, to manufacture the optical pickup device 10 of the invention, multiple pieces of optical elements and electronic components are fixed to a housing 12 formed as a single piece made of a resin material.

Figure 2:
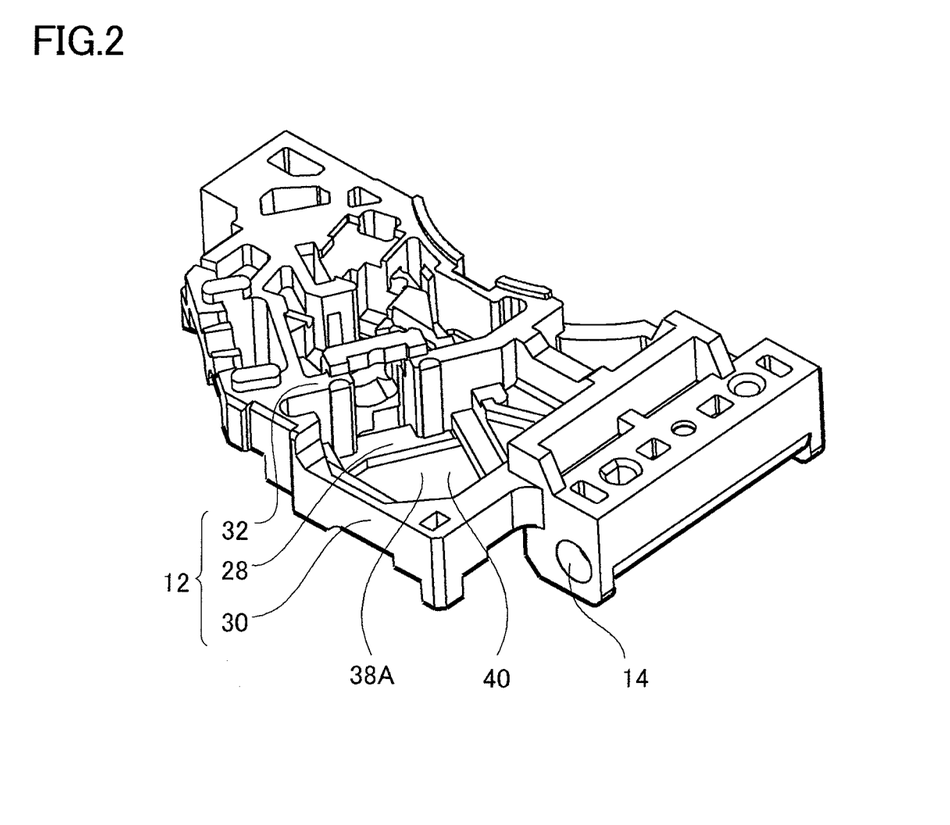

To be more specific, the housing with the shape shown in FIG. 2 is firstly formed by injection molding using a resin material such as an epoxy resin. As described earlier, the housing 12 includes a principal surface portion 28, external sidewalls 30, and internal sidewalls 32, and all of these are formed continuously to be integral. Multiple housing areas 40 in which to mount the optical elements and the electronic components are formed in the housing 12. In addition, multiple opening portions including an opening portion 38A are formed by cutting away parts of the principal surface portion 28. The opening portions 38A thus formed provide the electronic connections and the optical paths for the laser beam.

The housing 12 with the above-described shape is formed by transfer molding, that is, by introducing a liquid thermosetting resin into the cavity in a mold.

Then, as shown in FIGS. 1A and 1B, a circuit board 18 is fixed to the top surface of the housing 12. Here, the top surface refers to the surface where the principal surface portion 28 is exposed. The circuit board 18 is fixed to the top surface of the housing 12 via a fastener such as a screw. In addition, an objective lens driver unit 24 where an objective lens 26 is held is fixed to the top surface of the housing 12. To be more specific, a square-pole-shaped boss portion is formed in the housing 12 to protrude from a portion of the top surface of the housing 12, and the objective lens driver unit 24 is fixed to the boss portion via a fastener such as a screw. The objective lens driver unit 24 and the circuit board 18 are electrically connected to each other via a flexible circuit board or the like.

Then, referring to FIG. 1B, each of the optical elements and electronic components is placed in and fixed to the corresponding one of the housing areas 40 formed in the housing 12. Specifically, a semitransparent mirror 22, a reflecting mirror 23, a PDIC circuit board 36, and an LD holder 34 are disposed in their corresponding housing areas 40. Each of the optical elements and electronic components is fixed to the corresponding sidewall of the housing 12 via an electrically insulating adhesive such as an epoxy resin. In addition, a PDIC attached to the PDIC circuit board 36 is connected to the circuit board 18 via a flexible circuit board. The LD holder 34 is fixed in a manner that a circuit board attached to the backside surface of the LD holder 34 is perpendicular to the circuit board 18.

Figure 4:
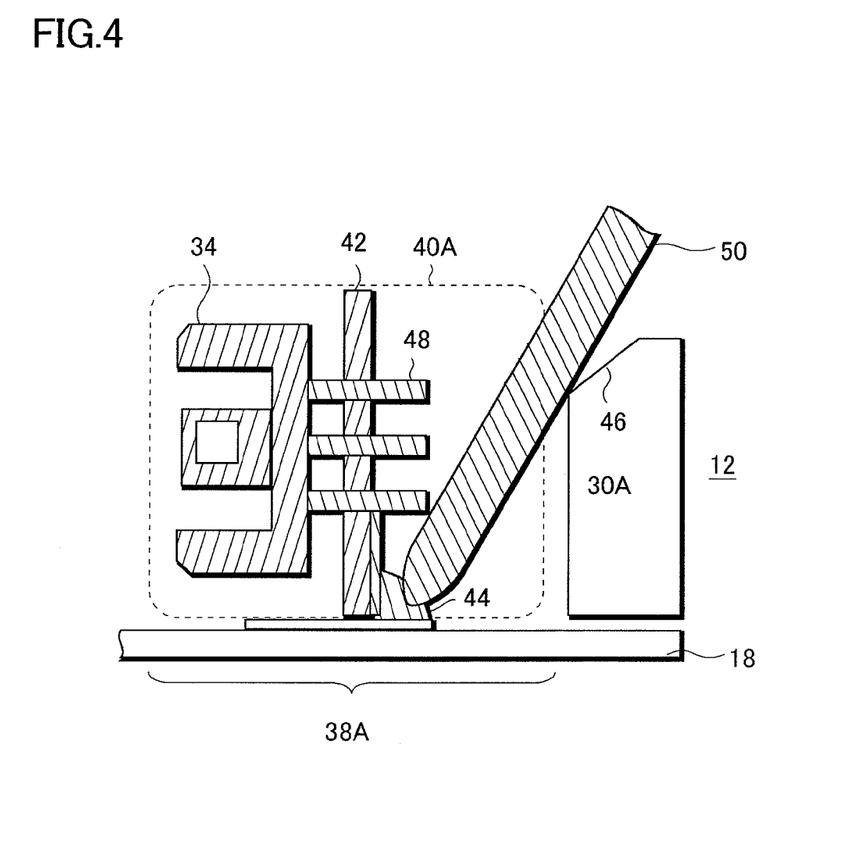
FIG. 4 is a sectional view illustrating a method of manufacturing the optical pickup device of the invention.

Then, referring to FIG. 4, a circuit board 42 attached to the LD holder 34 is connected to the circuit board 18 attached to the bottom surface of the housing 12. This connection between the circuit boards 42 and 18 allows the LD held by the LD holder 34 and the circuit board 18 to be connected to each other via terminals 48 and the circuit board 42. To be more specific, a solder paste is firstly applied to a position between the bottom end of the circuit board 42 and the circuit board 18, and then a heated soldering iron 50 is brought into contact with the solder paste to form a solder joint 44. The solder joint 44 fixes the circuit board 42 attached to the LD holder 34 to the circuit board 18, and electrically connects the conductive patterns formed on the principal surfaces of the circuit boards 42 and 18 to each other.

To reduce the overall size of the optical pickup device 10, a housing area 40A where the LD holder 34 is mounted is formed as small as possible. Accordingly, the circuit board 42 attached to the LD holder 34 is positioned near an external sidewall 30A. As a result, when the heated soldering iron 50 is inserted into the housing area 40A to form the solder joint 44 at this step, the soldering iron 50 may possibly touch and melt the inner-side part of the upper-end portion of the external sidewall 30A of the housing 12.

To avoid this, in this embodiment, the inner-side part of the upper-end portion of the external sidewall 30A is cut away to form a cut surface 46, so that the contact of the soldering iron 50 with the external sidewall 30A is prevented. The cut surface 46 is shaped as described earlier by referring to FIG. 3B. In addition, the cut surface 46 allows the soldering iron 50 to come into contact with the solder paste in a manner that the soldering iron 50 tilts sufficiently towards the circuit board 18 (i.e., the angle between the soldering iron 50 and the circuit board 18 becomes smaller). This increases the contact area of the soldering iron 50 and the solder paste so much that the solder paste can be melted immediately to form the solder joint 44.

The above-described step is followed by another step of checking whether or not each of the optical elements and electronic components is positioned accurately, and thus the manufacturing of the optical pickup device 10 with the configuration shown in FIG. 1 is completed.

Further, an optical-pickup supporting device is configured in such a way that: a guide shaft is inserted into a guide hole 14 shown in FIG. 1A; another guide shaft is fit in the guide groove 16 also shown in FIG. 1A; and two end portions of each of the guide shafts are supported by a framed-shaped chassis. Then, an optical disc drive is formed by incorporating the optical-pickup supporting device with the above configuration in the casing.

In the embodiments of the invention, a first circuit board disposed in a principal surface portion of a housing and a second circuit board attached to an electronic component are connected to each other via a conductive binder. In addition, a cut surface is formed in a sidewall, of the housing, located near the position where the conductive binder is welded. Accordingly, even when a melting tool such as a soldering iron is used to melt the binder, the soldering iron does not touch the sidewalls of the housing. As a consequence, the physical damage that would otherwise be caused to the housing by the heat of the soldering iron can be avoided.

What is claimed is:

1. An optical pickup device comprising:
   electronic components including a light-emitting element configured to emit a laser beam and a light-receiving element configured to receive a laser beam reflected by an optical recording medium;
   an optical element forming an optical path to guide the laser beam emitted by the light-emitting element to the optical recording medium and to guide the laser beam reflected by the optical recording medium to the light-receiving element;
   a housing where the electronic components and the optical element are mounted, the housing including,
      a principal surface portion,
      an external sidewall protruding continuously from an outer edge of the principal surface portion in a thickness direction of the principal surface portion,
      an internal sidewall formed in an area surrounded by the external sidewall, and protruding continuously from the principal surface portion in the thickness direction,
      a housing area surrounded by at least one of the internal sidewall and the external sidewall, and
      an opening portion formed at a corner portion of the housing by opening a part of the principal surface portion;
   an objective lens driver unit including an actuator to drive an objective lens, and being fixed to the principal surface portion of the housing;
   a first circuit board disposed on the principal surface portion of the housing so that a portion of the first circuit board is exposed in the opening at the corner portion of the housing; and
   a second circuit board connected to one of the electronic components and attached to the housing so that at least part of the second circuit board is disposed in the opening, the portion of the first circuit board exposed in the opening being connected via an electrically-conductive binder to the part of the second circuit board disposed in the opening,
   wherein an inner-side part of a protruding end portion of the external sidewall near the second circuit board is formed as a cut surface.

2. The optical pickup device according to claim 1, wherein the external sidewall is formed to surround the outer edge of the principal surface portion including an area near the second circuit board.

3. The optical pickup device according to claim 1, wherein protruding end portions of the external sidewall near the second circuit board are flush with each other.

4. The optical pickup device according to claim 1, wherein portions of the external sidewall near the second circuit board have a uniform thickness.

5. The optical pickup device according to claim 1, wherein a top surface of the cut surface and a top surface of the external sidewall form an angle of 45° or above.

6. The optical pickup device according to claim 1, wherein the second circuit board is disposed in the opening at the corner portion of the housing.

7. The optical pickup device according to claim 1, wherein the portion of the external sidewall provided with the cut surface has a height that is at least half of the height of an adjacent portion of the external sidewall.

8. The optical pickup device according to claim 1, wherein one of the electronic components is a laser diode held by a holder, and the laser diode is connected to the first circuit board via the second circuit board.

9. The optical pickup device according to claim 1, wherein the first circuit board and the second circuit board are rigid circuit boards.

10. A method of manufacturing an optical pickup device comprising the steps of:
    forming a housing including,
       a principal surface portion having a first principal surface and a second principal surface that is opposite from the first principal surface,
       an external sidewall protruding continuously from an outer edge of the principal surface portion in a thickness direction of the principal surface portion,
       an internal sidewall formed in an area surrounded by the external sidewall, and protruding continuously from the principal surface portion in the thickness direction,
       a housing area surrounded by at least one of the internal sidewall and the external sidewall, and
       an opening portion formed at a corner portion of the housing by opening a part of the principal surface portion, an inner-side part of a protruding end portion of the external sidewall near the corner portion being formed as a cut surface;
    disposing a first circuit board on the first principal surface of the housing so that a portion of the first circuit board is exposed in the opening at the corner portion of the housing;
    mounting, in the housing area of the housing, an electronic component to which a second circuit board is attached in a manner that at least part of the second circuit board is disposed in the opening; and
    connecting the portion of the first circuit board exposed in the opening to the part of the second circuit board disposed in the opening via an electrically-conductive binder melted by a melting tool inserted, through a space created by forming the cut surface, into the housing area where the second circuit board is mounted.

11. The method of manufacturing an optical pickup device according to claim 10, wherein the housing area where the electronic component is mounted is located in the corner portion of the housing, and the cut surface is formed in a portion of the external sidewall that form the corner portion of the housing.

12. The method of manufacturing an optical pickup device according to claim 10, wherein in the connecting step, a solder paste serving as the electrically-conductive binder is applied to a contact position between the first circuit board and the second circuit board, and a soldering iron serving as the melting tool is brought into contact with the solder paste to melt the solder paste and thus to form a solder joint.

\* \* \* \* \*